(12) United States Patent
Shepherd et al.

(10) Patent No.: US 10,798,171 B2
(45) Date of Patent: Oct. 6, 2020

(54) SENSOR DATA ADVERTISEMENT VIA NETWORK IDENTIFIER IN SHARED SPACES

(71) Applicant: Dell Products, LP, Round Rock, TX (US)

(72) Inventors: Jason A. Shepherd, Austin, TX (US); Liam B. Quinn, Austin, TX (US); Neal R. Kohl, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 432 days.

(21) Appl. No.: 14/789,849

(22) Filed: Jul. 1, 2015

(65) Prior Publication Data

US 2017/0006106 A1     Jan. 5, 2017

(51) Int. Cl.
*G06F 15/16* (2006.01)
*H04L 29/08* (2006.01)
*H04L 29/12* (2006.01)

(52) U.S. Cl.
CPC .......... *H04L 67/12* (2013.01); *H04L 67/1097* (2013.01); *H04L 67/28* (2013.01); *H04L 67/2833* (2013.01); *H04L 67/306* (2013.01); *H04L 61/3065* (2013.01)

(58) Field of Classification Search
CPC ..... H04L 67/12; H04L 67/1097; H04L 67/28; H04L 67/2833; H04L 67/306
USPC .................................................. 709/225, 223
See application file for complete search history.

(56) References Cited

U.S. PATENT DOCUMENTS

| 8,326,687 | B2 | 12/2012 | Tanaka |
| 8,644,842 | B2 | 2/2014 | Arrasvuori et al. |
| 2010/0308962 | A1* | 12/2010 | Li ........................... G06F 21/32 340/5.83 |
| 2010/0328418 | A1* | 12/2010 | Winkler .............. H04L 65/4092 348/14.03 |
| 2012/0158520 | A1 | 6/2012 | Momeyer et al. |
| 2013/0003654 | A1* | 1/2013 | Iyer ....................... H04W 84/22 370/328 |
| 2013/0218816 | A1* | 8/2013 | Yu ......................... G06N 99/005 706/12 |
| 2014/0373124 | A1* | 12/2014 | Rubin .................... H04L 67/28 726/7 |
| 2015/0149292 | A1* | 5/2015 | Feghali ................... H04W 4/04 705/14.64 |
| 2016/0278006 | A1* | 9/2016 | Lee ....................... H04W 12/00 |

* cited by examiner

*Primary Examiner* — David R Lazaro
*Assistant Examiner* — Mariegeorges A Henry
(74) *Attorney, Agent, or Firm* — Larson Newman, LLP

(57) ABSTRACT

Systems and methods for communicating with a plurality of networked sensors include identifying at least one class of networked sensors of the plurality of networked sensors, broadcasting a virtual network identifier to advertise the availability of the at least one class of networked sensors, directing a device attempting to access a network identified by the virtual network identifier to a splash page where a user can subscribe to information from the one or more classes of network sensors, and providing sensor data from the network sensors to a subscribed user.

20 Claims, 4 Drawing Sheets

SENSOR DATA ADVERTISEMENT VIA NETWORK IDENTIFIER IN SHARED SPACES

FIELD OF THE DISCLOSURE

The present disclosure generally relates to information handling systems, and more particularly relates to sensor data advertisement via a network identifier in shared spaces.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
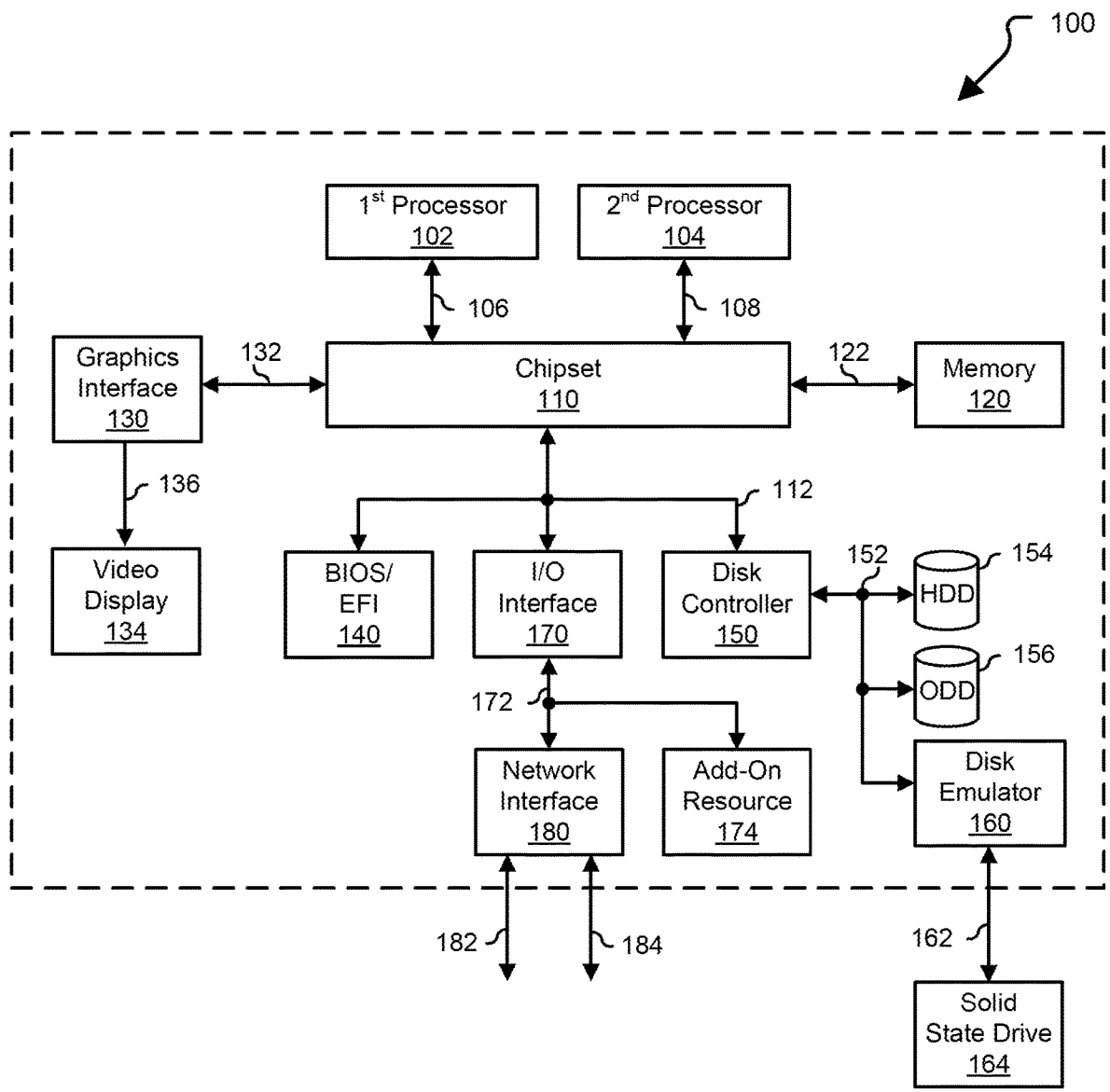
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
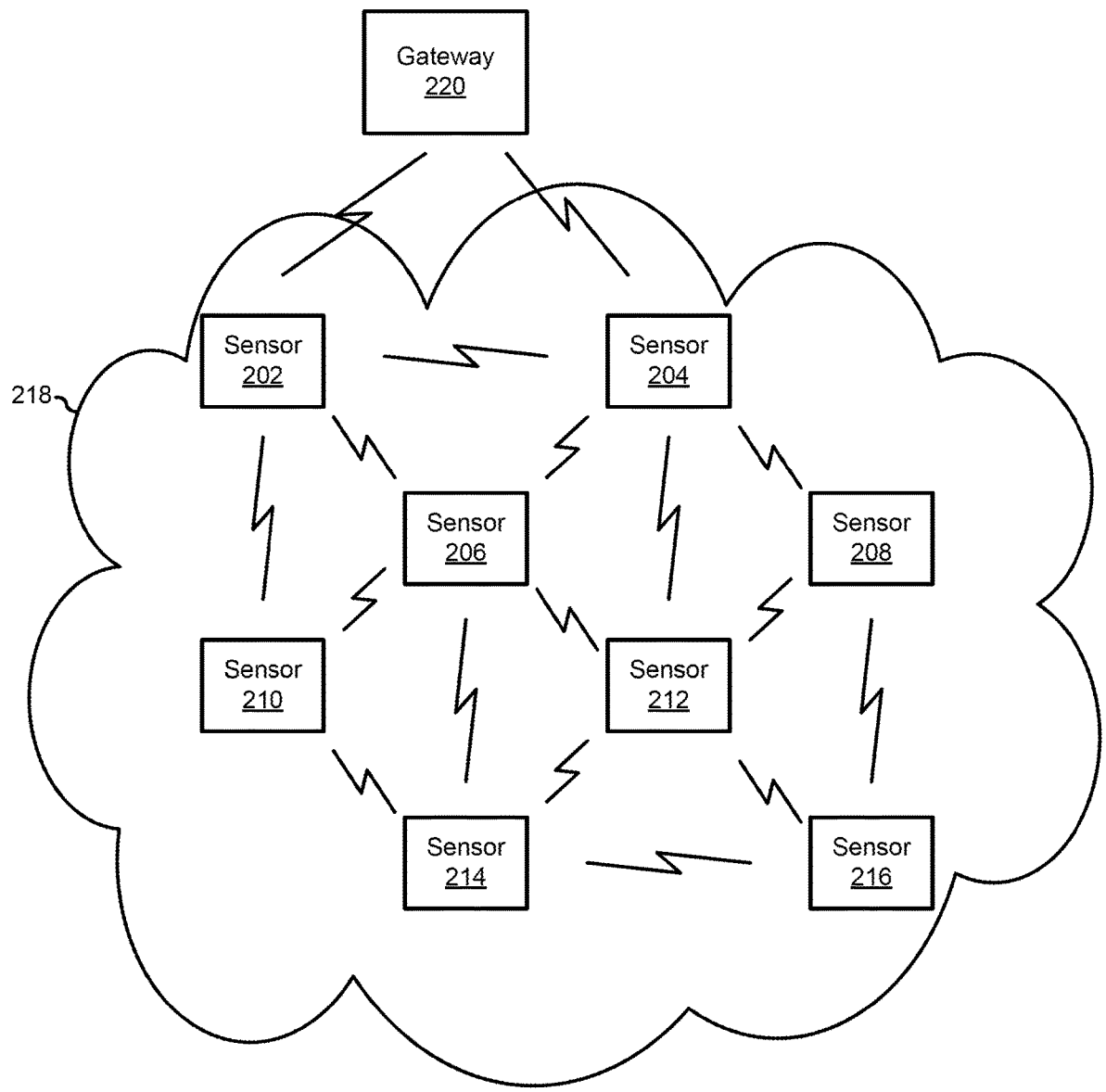
FIG. 2 is a block diagram illustrating a mesh network of sensors, in accordance with various embodiments.

FIG. 2 is a block diagram 200 illustrating an exemplary network of sensors. A plurality of sensors 202, 204, 206, 208, 210, 212, 214, and 216 can be placed in an environment. The sensors 202, 204, 206, 208, 210, 212, 214, and 216 can include environmental monitoring sensors, energy management sensors, infrastructure management sensors, building automation sensors, transportation monitoring sensors, and the like. Environmental monitoring sensors can be used to monitor air/water quality (such as concentrations of pollutants or particulates), atmospheric conditions (such as temperature, humidity, wind speed, or rain fall), soil conditions (such as temperature, moisture content, or movement), and the like. Energy management sensors can be used to monitor energy consumption of systems and appliances and can be used to control systems and appliances to manage energy consumption, such as by shifting usage from peak to off-peak times. Building automation sensors can be used to monitor and control lighting, heating, ventilation, air conditioning, appliances, communication systems, entertainment and home security devices to improve convenience, comfort, energy efficiency, and security. Infrastructure management sensors can be used to monitor events or changes in conditions that can compromise safety and increase risk and to provide information that can be used for scheduling repair and maintenance activities in an efficient manner, such as by coordinating tasks between different service providers and users of the infrastructure. Transportation monitoring sensors can provide information about traffic flow, parking capacity, transportation utilization, and the like which can be used to redirect traffic around congestion, reallocate public transportation to high demand routes, and direct drivers to available parking, as well as provide information for usage based billing.

Sensors 202 through 216 can form a mesh network 218 by communicating with sensors in close proximity. For example, sensor 206 can communicate directly with sensors 202, 204, 210, and 212, and can communicate with sensor 208 through sensor 204 or 212. The mesh network 218 can provide a fault tolerant communication network to automatically adapt when a sensor goes off line. For example, sensor 212 may normally communicate with sensor 202 via sensor 206. If sensor 206 is not responding, sensor 212 could communicate with sensor 202 via sensor 204 until the connectivity of sensor 206 is restored. Gateway 220 can communicate with the sensors 202 through 216, such as by way of sensors 202 and 204. Gateway 220 can provide an access point to a larger network to enable remote management of the sensors 202 through 216 and remote access to the information provided by the sensors. Additionally, gateway 220 can aggregate the information from sensors 202 through 216 and provide the information to a cloud based platform or directly to remote devices.

Figure 3:
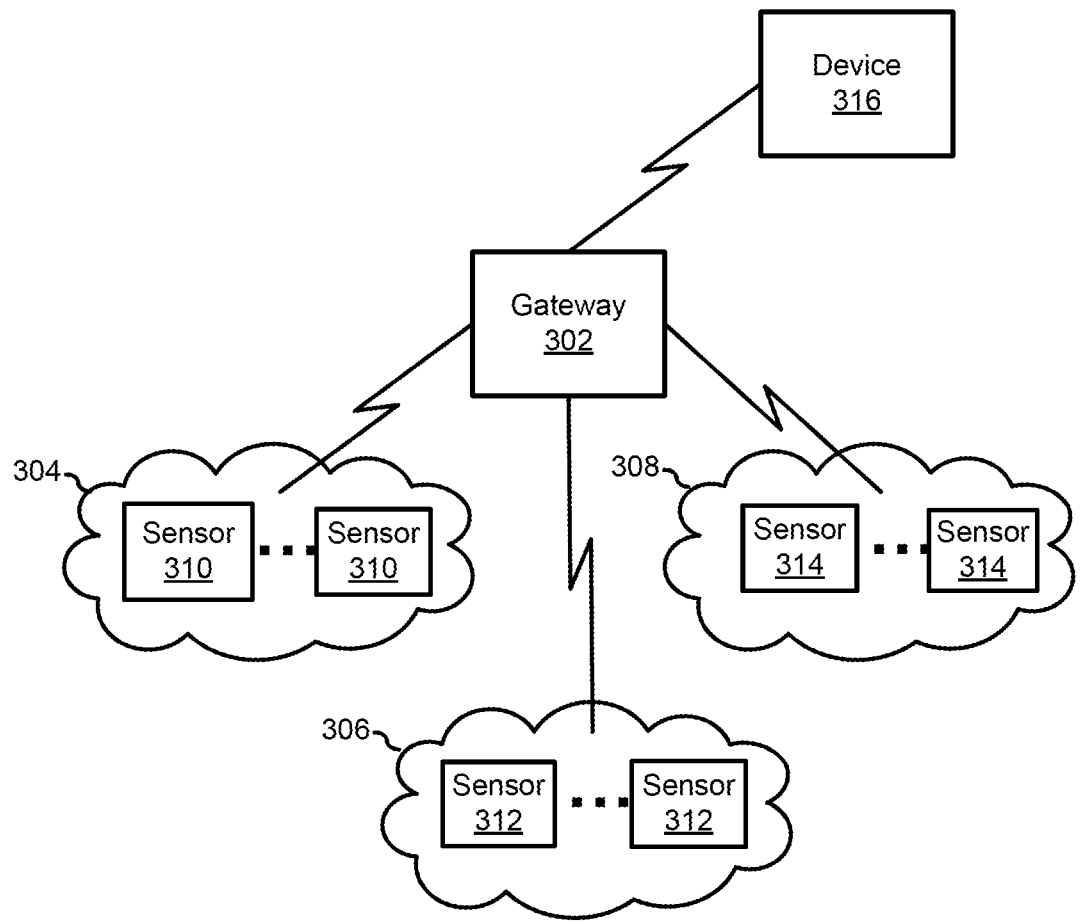
FIG. 3 is a block diagram illustrating a network gateway in communication with a plurality of networked sensors, in accordance with various embodiments.

FIG. 3 is a block diagram illustrating an exemplary system 300 for communicating with a sensor network, such as mesh network 218 of FIG. 2. Gateway 302 can be in communication with mesh networks 304, 306, and 308. In various embodiments, the networks 304, 306, and 308 may operate on different networking protocols, such as Bluetooth, Wi-Fi, Z-Wave, ZigBee, X-10, or the like. Mesh networks 304, 306, and 308 may also operate using different communication media, such as radio frequency communication, dedicated hardwired networks, or embedded signals into existing power circuits. Mesh network 304 can include a plurality of sensors 310 in communication with one another and gateway 302. Similarly, Mesh network 306 can include a plurality of sensors 312 in communication with one another and gateway 302, and Mesh network 308 can include a plurality of sensors 314 in communication with one another and gateway 302. Gateway 302 can aggregate the information provided by sensors 310, 312, and 314 and abstract communication with the sensors from the underlying protocols of each mesh network 304, 306, and 308 as well as the underlying protocols for each type of sensor. Device 316 can communicate with gateway 302, such as remotely by way of the Internet or directly by way of a local Wi-Fi network or Bluetooth connection or other wired or wireless interface. Through gateway 302, device 316 can communicate with sensor mesh networks 304, 306, and 308 to obtain information and/or manage sensors 310, 312, and 314 without requiring device 316 to be able to communicate according to the protocols in effect for each of sensor networks 304, 306, and 308.

Figure 4:
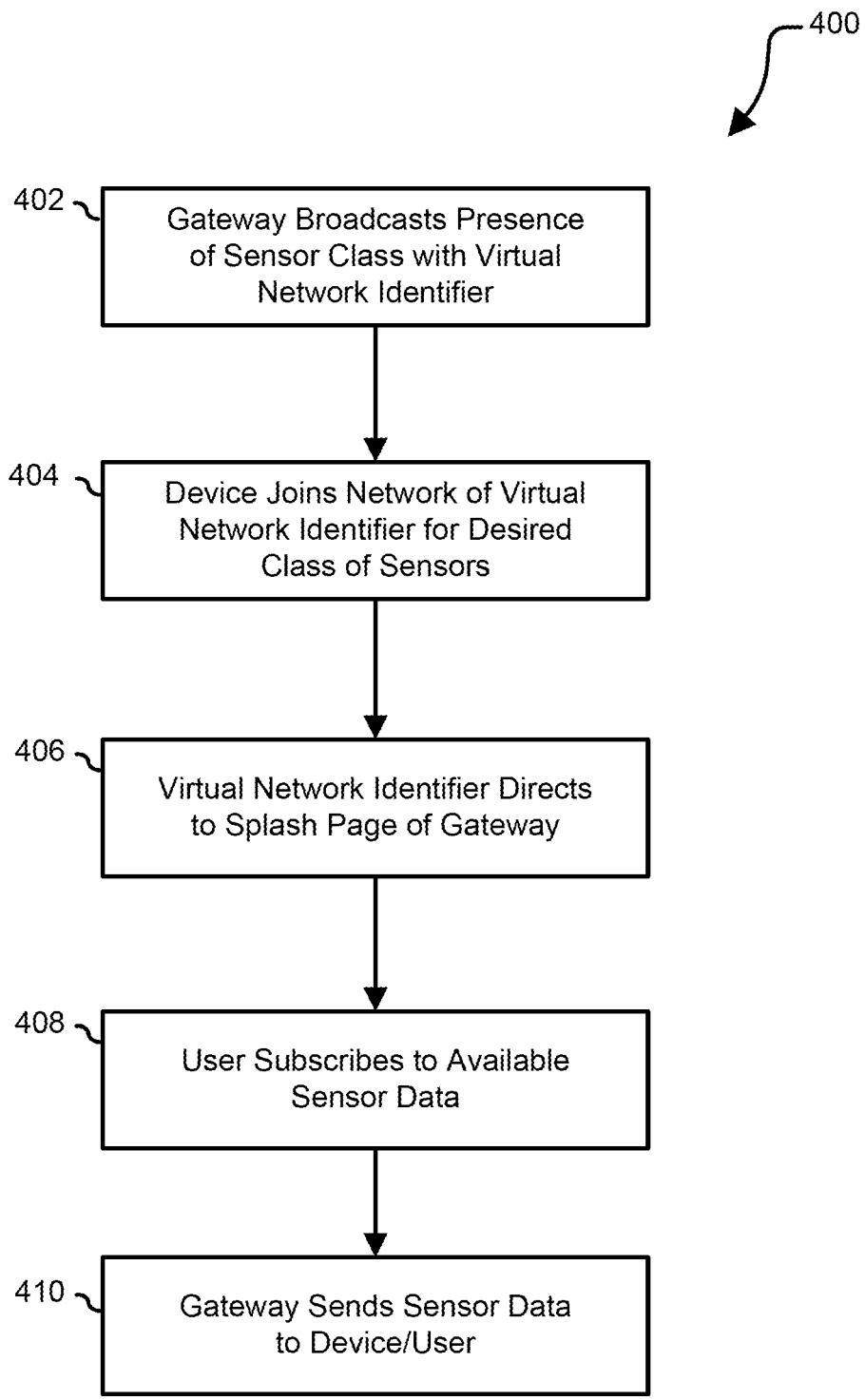
FIG. 4 is a flow diagram illustrating an exemplary method of providing sensor data to networked devices, in accordance with various embodiments.

FIG. 4 is a flow diagram illustrating a method 400 of providing data from networked sensors to a user. In various embodiments a gateway, such as gateway 302 of FIG. 3, can be in communication with a plurality of remote networked sensors. At 402, the gateway can broadcast a virtual network identifier, such as a virtual Service Set Identifier (SSID). The virtual network identifier can identify a class of sensors within the sensor network. In various embodiments, such as when using a virtual SSID in a Wi-Fi environment, the gateway can substantially continuously broadcast the virtual network identifier. A Wi-Fi enabled device looking for a Wi-Fi network to join would be made aware of the class of sensors in the sensor network from the broadcasted SSIDs it detects. In alternate embodiments, the gateway can broadcast a virtual network identifier when a new device is detected on a network or in the area.

In various embodiments, an operator can create a sensor class label and identify a subset of networked sensors belonging to the class. The operator can configure the gateway to broadcast a virtual network identifier for the class. Alternatively, the gateway may detect the sensors within the sensor network and automatically classify the sensors according to a pre-established set of classes. For example, when an ambient temperature sensor is added the sensor network, the gateway can add the sensor to a group of temperature sensors. Further, when a parking space sensor is added to the sensor network, the gateway can add the sensor to the group of parking sensors. Then, for example, the gateway can broadcast a virtual network identifier "LOCALTEMP" corresponding to the temperature sensors and a virtual network identifier "PARKING".

The virtual network identifier can be used by devices in the area to identify the various classes of sensors deployed, and a user can select a virtual network identifier corresponding to a class of sensors of interest. At 404, a device can join the network identified by the virtual network identifier corresponding to the class of sensors of interest. For example, a user interested in knowing the local temperature, may select to opt to join a wireless local area network (WLAN) identified by the SSID "LOCAL_TEMP", whereas a user interested in knowing the availability of parking may opt to join a WLAN identified by the SSID "PARKING".

At 406, when the device joins the network identified by the virtual network identifier, the gateway can direct the device to a splash page similar to a splash page requiring registration or payment for a pay-per-use WLAN. The splash page can provide a way for subscribing to information provided by the class of sensors. Additionally, the splash page may provide a way to subscribe to information provided by other classes of sensors, rather than forcing the user to join multiple networks for information from multiple classes of sensors.

In various embodiments, the organization owning the sensors can require payment for access to the information provided by the sensors. Alternatively, the information may be provided free of charge. In various embodiments, there may be various levels of access to the information, such as a public access level, or even a free level and a paid level that has more detailed information. There may be an access level for sharing information within or between organizations that provides useful information to other users within the organizations but may provide less than full access to the sensors. In various embodiments, there may be an administrator level of access that provides complete access to the sensor information and the ability to remotely manage the sensors.

At 408, various embodiments can enable the user to subscribe to the available sensor data. For example, the user can fill out the required information on the splash page. In various embodiments, the splash page may require the user to provide billing information or credentials to authenticate the user as a member of a group or an organization to obtain access to a higher level of information. In other embodiments, the splash page may require contact information, such as an email address or cell phone number for sending sensor information. At 410, the gateway can send the sensor information to the device. In various embodiments, the level of information sent to the device can depend on the level of access the user is authorized for based on the information provided when filling out the form on the splash page.

In various embodiments, once registration or authentication is complete, the gateway may provide the device with access to a WLAN and may stream the sensor information to the device. In various embodiments, the gateway may not provide access to the Internet through the WLAN and the device may fall back to other connectivity. Alternatively, if the device leaves the WLAN, the device may receive the sensor information through various other means, such as push notifications, text messages, email messages, through a webpage, or the like.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system in communication with a plurality of networked sensors using one or more mesh networks, comprising:
   a network gateway in communication with the plurality of networked sensors wherein the network gateway detects the plurality of networked sensors and automatically classifies the plurality of networked sensors into a class of networked sensors according to a pre-established set of classes;
   a network interface configured to:
   broadcast a network identifier for a virtual network, the network identifier advertising the availability of the class of networked sensors of the plurality of networked sensors; and
   direct a device attempting to access the virtual network to a splash page, the virtual network being separate from the one or more mesh networks; and
   a processor configured to:
   provide the splash page where a user can subscribe to information from the class of network sensors; and
   provide sensor data from the network sensors to a subscribed user.

2. The information handling system of claim 1, wherein the network identifier is a Service Set Identifier (SSID).

3. The information handling system of claim 1, wherein the networked sensors include environmental monitoring sensors, energy management sensors, infrastructure management sensors, building automation sensors, transportation monitoring sensors, or any combination thereof.

4. The information handling system of claim 1, wherein the sensor data provided to the subscribed user is based on the class of network sensor selected by the subscribed user.

5. The information handling system of claim 1, wherein the sensor data provided to the subscribed user is based on an access level of the subscribed user.

6. The information handling system of claim 1, wherein the subscribed user has a public level of access and the provided sensor data is a portion of the available sensor data identified for public access by an owner or administrator of the network sensors.

7. The information handling system of claim 1, wherein the subscribed user has an administrator level of access and the provided sensor data includes all of the available sensor data.

8. The information handling system of claim 1, wherein the subscribed user has an authorized level of access and the provided sensor data is a portion of the available sensor data identified for sharing within or between organizations by an owner or administrator of the network sensors.

9. A method comprising:
   communicating with a plurality of networked sensors and a network gateway using one or more mesh networks, wherein the network gateway detects the plurality of networked sensors and automatically classifies the plurality of networked sensors into a class of networked sensors according to a pre-stablished set of classes;
   identifying at least one class of networked sensors of the plurality of networked sensors;
   broadcasting a network identifier for a virtual network, the network identifier advertising the availability of the at least one class of networked sensors, the virtual network being separate from the one or more mesh networks;

directing a device attempting to access the virtual network to a splash page where a user can subscribe to information from the one or more classes of network sensors; and providing sensor data from the network sensors to a subscribed user.

10. The method of claim 9, wherein the network identifier is a Service Set Identifier (SSID).

11. The method of claim 9, wherein the networked sensors include environmental monitoring sensors, energy management sensors, infrastructure management sensors, building automation sensors, transportation monitoring sensors, or any combination thereof.

12. The method of claim 9, wherein the sensor data provided to the subscribed user is based on an access level of the subscribed user.

13. The method of claim 9, wherein the subscribed user has a public level of access and the provided sensor data is a portion of the available sensor data identified for public access by an owner or administrator of the network sensors.

14. The method of claim 9, wherein the subscribed user has an administrator level of access and the provided sensor data includes all of the available sensor data.

15. The method of claim 9, wherein the subscribed user has an authorized level of access and the provided sensor data is a portion of the available sensor data identified for sharing within or between organizations by an owner or administrator of the network sensors.

16. A sensor network comprising:

a network gateway in communication with a plurality of networked sensors wherein the network gateway detects the plurality of networked sensors and automatically classifies the plurality of networked sensors into a class of networked sensors according to a pre-established set of classes;

the plurality of networked sensors configured to:
obtain information about an environment; and
communicate the information to the network gateway via one or more mesh networks; and the networked gateway including:

a network interface configured to:
broadcast a network identifier for a virtual network, the network identifier advertising the availability of at least one class of networked sensors of the plurality of networked sensors; and
direct devices attempting to access the virtual network to a splash page, the virtual network being separate from the one or more mesh networks; and a processor configured to:
provide the splash page where a user can subscribe to information from the class of network sensors; and
provide sensor data from the network sensors to a subscribed user.

17. The sensor network of claim 16, wherein the network identifier is a Service Set Identifier (SSID).

18. The sensor network of claim 16, wherein the networked sensors include environmental monitoring sensors, energy management sensors, infrastructure management sensors, building automation sensors, transportation monitoring sensors, or any combination thereof.

19. The sensor network of claim 16, wherein the sensor data provided to the subscribed user is based on the class of network sensor selected by the subscribed user.

20. The sensor network of claim 16, wherein the sensor data provided to the subscribed user is based on an access level of the subscribed user.

* * * * *